United States Patent [19]
Johnson et al.

[11] Patent Number: 6,055,516
[45] Date of Patent: Apr. 25, 2000

[54] ELECTRONIC SOURCING SYSTEM

[75] Inventors: James M. Johnson, Bridgeville; Robert P. Kinross, Ben Avon; Francis J. Melly, Pittsburgh; Douglas A. Momyer, Upper St. Clair, all of Pa.

[73] Assignee: Procurenet, Inc., Fairfield, N.J.

[21] Appl. No.: 09/234,366

[22] Filed: Jan. 20, 1999

Related U.S. Application Data

[63] Continuation of application No. 08/288,577, Aug. 10, 1994.

[51] Int. Cl.[7] .................................................. G06F 17/60
[52] U.S. Cl. .................... 705/27; 705/26; 701/1; 701/10; 701/104
[58] Field of Search ............... 705/1, 26, 27; 707/1, 10, 100, 104

[56] References Cited

U.S. PATENT DOCUMENTS

| | | | |
|---|---|---|---|
| 4,135,241 | 1/1979 | Stanis et al. | 364/200 |
| 4,141,078 | 2/1979 | Bridges, Jr. et al. | 364/900 |
| 4,336,589 | 6/1982 | Smith et al. | 364/403 |
| 4,509,123 | 4/1985 | Vereen | 364/300 |
| 4,636,950 | 1/1987 | Caswell et al. | 364/403 |
| 4,656,591 | 4/1987 | Goldberg | 364/478 |
| 4,887,208 | 12/1989 | Schneider et al. | 364/403 |
| 4,897,867 | 1/1990 | Foster et al. | 379/94 |
| 4,920,488 | 4/1990 | Filley | 364/403 |
| 4,958,280 | 9/1990 | Pauly et al. | 364/403 |
| 4,972,318 | 11/1990 | Brown et al. | 364/403 |
| 4,984,155 | 1/1991 | Geier et al. | 364/401 |
| 4,992,940 | 2/1991 | Dworkin | 364/401 |
| 5,038,283 | 8/1991 | Caveney | 364/403 |
| 5,077,665 | 12/1991 | Silverman et al. | 364/408 |
| 5,101,352 | 3/1992 | Rembert | 364/401 |
| 5,103,079 | 4/1992 | Barakai et al. | 235/380 |
| 5,117,354 | 5/1992 | Long et al. | 364/401 |
| 5,168,444 | 12/1992 | Cukor et al. | 364/401 |
| 5,168,445 | 12/1992 | Kawashima et al. | 364/403 |
| 5,305,199 | 4/1994 | LoBiondo et al. | 364/403 |
| 5,319,542 | 6/1994 | King, Jr. et al. | 364/401 |
| 5,758,327 | 5/1998 | Gardner et al. | 705/26 |
| 5,778,355 | 7/1998 | Boyer et al. | 707/2 |
| 5,799,289 | 8/1998 | Gukushima et al. | 705/400 |

FOREIGN PATENT DOCUMENTS

| | | |
|---|---|---|
| 0 697 669 A2 | 8/1995 | European Pat. Off. . |
| WO 90/11572 | 10/1990 | WIPO . |

OTHER PUBLICATIONS

European Search Report, Application No. 95 305364, Dated Aug. 2, 1997.

"Texas Instruments Puts the MRO Buy On Line," *Purchasing*, p. 37, May 19, 1994.

"IBM Technical Viewer/2 General Information Manual," IBM Corporation, 1991.

"IBM Technical Viewer/2" product information brochure, IBM Corporation, undated.

(List continued on next page.)

*Primary Examiner*—Edward R. Cosimano
*Attorney, Agent, or Firm*—Rader, Fishman & Grauer PLLC

[57] ABSTRACT

An electronic sourcing system includes a computer that maintains a catalog database of data including product information (such as product identification and descriptive information) relating to catalog items available from vendor product catalogs, and a means for building (generating) a requisition including at least one requisitioned item. Information at least partially identifying an item desired to be requisitioned is entered by a user, and utilized by a means for searching the database for catalog items matching that information and for selecting at least one catalog item located as a result of the search. Text describing the catalog items, and images of the items, may be viewed. Data identifying selected catalog items are communicated to the requisition building means, which generates a requisition including entries for items corresponding to the selected catalog items. The system checks the availability in one or more inventory locations of the corresponding desired catalog items, and generates one or more purchase orders for desired items from inventory locations stocking the items.

29 Claims, 5 Drawing Sheets

OTHER PUBLICATIONS

"Guide to Using First Place," Automated Catalogue Services Inc., Aug. 1993.

"Grainger Electronic Catalog User's Guide," Edition 6, pp. 29–33 and 49–50, 1994.

"Automated Catalog Systems" product information brochure, Distrivision Development Corporation, 1994.

"SweetSource User's Guide," Sweet's Electronic Publishing, Mar. 1, 1993.

"Aldrich Catalog on Disk Reference Manual," Aldrich Chemical Company, Inc., 1994.

"Easel to Move Development to Windows," *Infoworld*, May 16, 1994.

"Easel Eases the Way to OO," *Computer Select*, Jun. 1994.

"Stockclerk Inventory Management System" product information brochure, IOBar, Inc., 1993.

"Fisher StockPro™ Inventory Management System" brochure, Fisher Scientific, 1990.

"Systems by Fisher/Inventory Management System/Stock-Pro®—Single–User Version" user manual, pp. 6–1 to 6–14, 6–21 to 6–26, 7–1 to 7–18, 8–1 to 8–20, 9–1 to 9–6, and 10–1 to 10–8, Fisher Scientific Company, Feb. 28, 1989.

"Fisher Scientific PurchasePro" user manual, version 1.1., Introduction pp. 1–6, File Editor pp. 1–12, Purchase Requisitions pp. 1–12, Purchase Orders pp. 1–8, 23, and 34, Vendor Quotes p. 1, Fastback Orders pp. 1–8, Reports p. 1, ReportPro p. 1, 1984.

"Lightning™ Fisher's Electronic Order Entry System" brochure, Fisher Scientific Company, 1989.

"Lightning™ Order Entry and Information System" user manual, pp. 1–6, 19–54, and 91–96, Fisher Scientific Company, 1990.

"Fisher Reliance™ System" brochure, Fisher Scientific Company, 1989.

"*Fisher 88*" catalog, pp. 1536, 1549–1567, Fisher Scientific Company, 1987.

Excerpt from "A Prism Electronic Catalog Proposal: Product Information System for Sales and Marketing," prepared by Fisher Scientific Company, presented by MediaShare Corporation, Aug. 31, 1993.

ELECTRONIC SOURCING SYSTEM

This application is a continuation of U.S. application Ser. No. 08/288,577 filed on Aug. 10, 1994.

BACKGROUND OF THE INVENTION

This invention relates to systems and methods for interfacing product information, such as is typically found in vendor catalogs that are provided to customers, and requisition/purchasing systems and methods that may use the results of searches of product information.

There are a number of known requisition/purchasing systems that manage and process requisitions and purchase orders. One such system is the Fisher Scientific Requisition and Inventory Management System ("Fisher RIMS"), described in co-pending patent application Ser. No. 08/042,168, filed Apr. 2, 1993, issued as U.S. Pat. No. 5,712,989 on Jan. 28, 1998, and assigned to Fisher Scientific Company of Pittsburgh, Pa., the disclosure of which is incorporated herein by reference. As its title suggests, Fisher RIMS can also manage inventory. In the Fisher RIMS system, requisition records are created from a real-time interaction between a host computer (generally a mainframe) and a local computer (generally at a customer site), with each computer using data from its own respective database of inventory in conjunction with information entered by a customer service representative operating the local computer. By accessing its respective database, each computer can build and transmit to the other computer communications blocks of data relating to a particular requisition of an item in inventory (or to the management of the inventory itself). The other computer can then use the received data to continue processing of the requisition. Thus, requisition records are created from a real-time interaction between the host and local computers, with each computer using data from its respective database in conjunction with information entered by a customer service representative operating the local computer.

Other requisition/purchasing systems can be grouped broadly into four classes. First, requisition management systems licensed to corporations purchasing for their own use include ORION software (from Medical Management Systems), ENTERPRISE software (from ESI), and NOVA software (from Johnson & Johnson). Second, there exist systems provided by distributors for transmitting orders to them in proprietary formats. Such systems include QUICK-LINK (from Abbott), ASAP system (from Baxter) and LIGHTNING system (from Fisher Scientific). Third, software packages licensed by software developers to customers and/or suppliers enable the transmission of customer purchase orders as EDI purchase orders (in ANSI X.12 format). Examples of such systems include ON-CALL EDI (from TSI International), EDI Express software (from General Electric Information Services) and GETRAN software (from Sterling Software). Fourth, comprehensive business management packages such as REAL WORLD software (from Real World Corporation of Concord, N.H.) and ASK software (from The ASK Group) contain a purchasing module to create replenishment orders when inventoried items fall below restocking points. The same purchasing module can also be used to place spot orders for products keyed in by the customer's purchasing personnel.

None of these known requisition/purchasing systems (including Fisher RIMS), however, provides a capability for a user readily to search for and locate information about the products that may be requisitioned and ordered in connection with the requisition/purchasing system. They also do not provide the capability for a user to search a database containing two or more vendor catalogs, and then to transfer information about the items selected as a result of such searches into a requisition/purchasing system such as Fisher RIMS for building a requisition for the catalog items.

Computer systems that are capable of searching databases containing a product catalog of a particular vendor, for example on CD-ROM, are also known. Such systems can search for user requested information about products and create orders which the user can save, print or, in some cases, facsimile directly to a vendor. The known computer systems for searching vendor catalogs are limited in that only one such vendor catalog is accessible to a user at any given time. They are also limited in that they can only create an order within the particular vendor catalog database. They cannot source items to be requisitioned from a database containing multiple catalogs or interact with a requisition/purchasing system (such as Fisher RIMS) to create a purchase order or orders including the items located from that sourcing operation.

Thus, it would be desirable to provide an electronic sourcing system that provides a means for transferring information between a requisition/purchasing system that may use the results of a search of product information and a means for searching large volumes of product information such as would be included in a vendor product catalog or catalogs.

It would also be desirable to provide such an electronic sourcing system that is capable of searching a database containing at least two vendor product catalogs for product information.

It would further be desirable to provide such an electronic sourcing system that is capable of searching a database of catalog items contain in at least two vendor product catalogs, selecting particular items located, and transferring information about the items selected (for example, a catalog number and a vendor identifier, such as vendor name and/or vendor number) to a requisition/purchasing system for inclusion in a requisition generated by the system.

It would further be desirable to provide an electronic sourcing system that is capable of creating an order list including items located as the result of a catalog database search and transferring that order list of desired catalog items to a requisition/purchasing system for inclusion of the catalog items as entries in a requisition generated by the system.

SUMMARY OF THE INVENTION

In view of the foregoing, it is an object of this invention to provide an electronic sourcing method and system that provides a user with the capability of searching a database containing data (including product/vendor identification, and other product information) relating to items available from at least two vendor product catalogs, and the capability of transferring the product information for desired catalog items obtained as a result of the search to a requisition/purchasing system for use in generating a requisition including entries for the desired catalog items.

It is also an object of this invention to provide an electronic sourcing system that provides a means for bi-directionally transferring information between a requisition/purchasing system that may use the results of a search of such product information, and a means for searching large volumes of product information such as would be included in a vendor product catalog.

It is a further object of this invention to provide an electronic sourcing system capable of creating an order list including desired catalog items located as the result of such a database search, and transferring that order list to a requisition/purchasing system for generating a requisition including entries for the desired catalog items.

In accordance with the invention, an electronic sourcing system and method used by the system are provided. The system includes a computer that maintains a catalog database of data including product information (such as product identification information, and descriptive information) relating to catalog items available from vendor product catalogs, and a means for building (generating) a requisition including at least one requisitioned item. Information at least partially identifying an item desired to be requisitioned is entered by a user, and utilized by a means for searching the database for catalog items matching that information and for selecting at least one catalog item located as a result of the search. Text describing the catalog items, and images of the items, may be viewed. Data identifying selected catalog items are communicated to the requisition building means, which generates a requisition including entries for items corresponding to the selected catalog items. Additionally, the invention includes a means for checking the availability in one or more inventory locations of the corresponding desired catalog items, and for generating one or more purchase orders for desired items from inventory locations stocking the items.

BRIEF DESCRIPTION OF THE DRAWINGS

The above and other objects and advantages of the invention will be apparent from consideration of the following detailed description, taken in conjunction with the accompanying drawings, in which like reference characters refer to like parts throughout, and in which.

DETAILED DESCRIPTION OF THE INVENTION

Figure 1A:
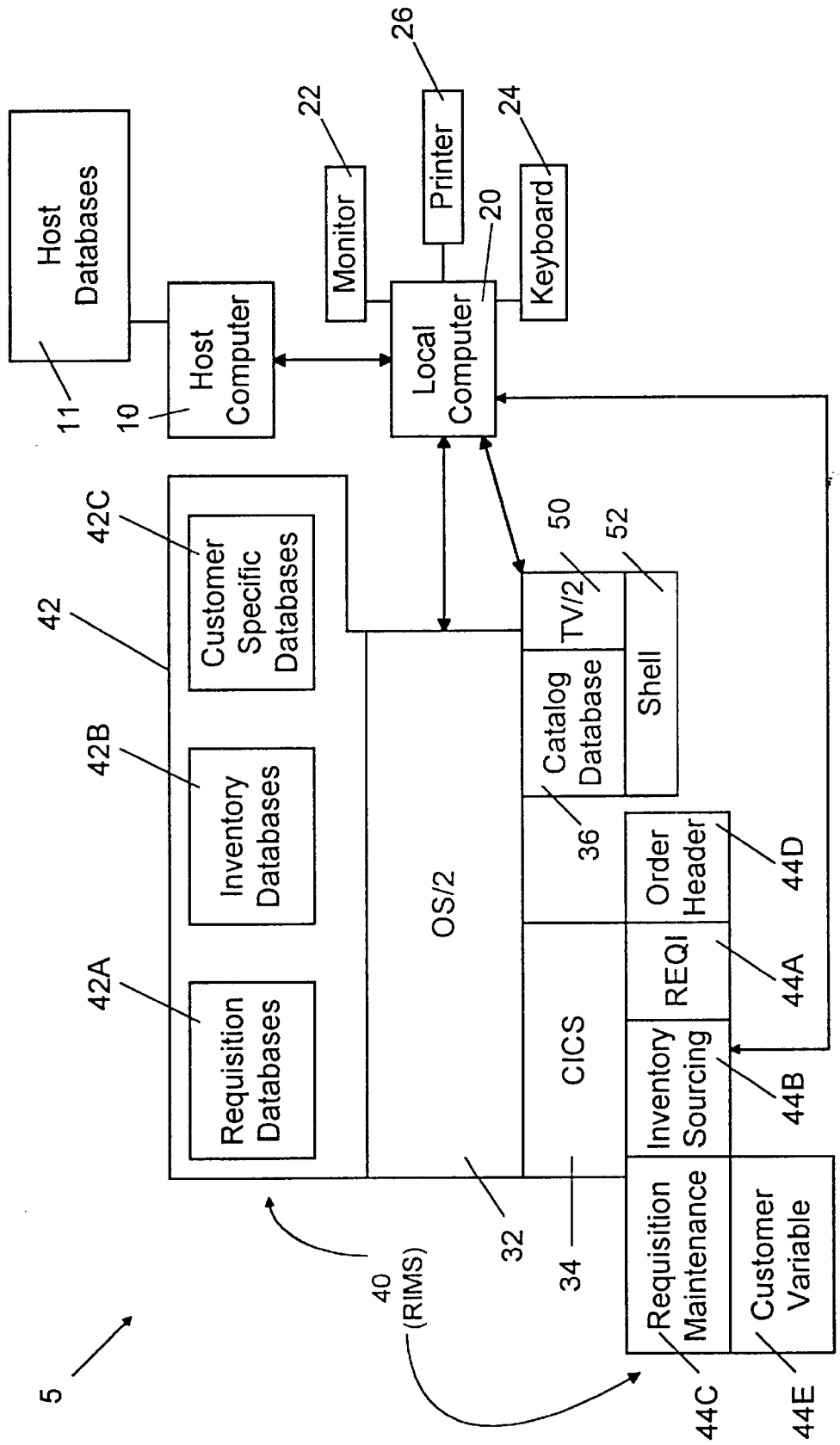
FIG. 1A is a block diagram showing one exemplary embodiment of the overall system of the present invention.
Figure 1B:
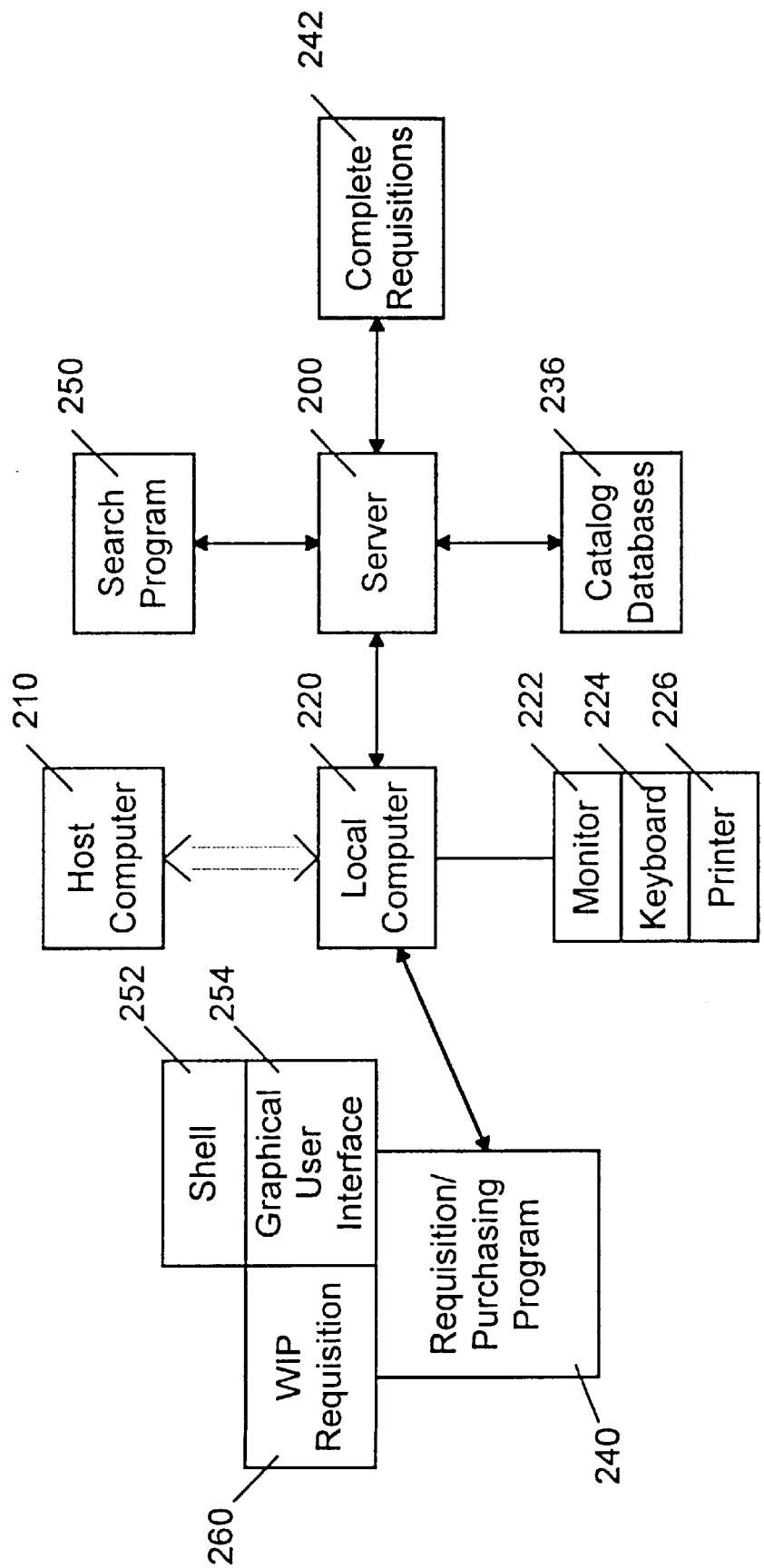
FIG. 1B is a block diagram showing another exemplary embodiment of the overall system of the present invention.

FIGS. 1A and 1B show preferred embodiments of the electronic sourcing system 5 of the present invention. As shown in FIG. 1A, a local computer 20, which is preferably located at or near a Customer site and the site of Just-In-Time ("JIT") Inventory, is preferably used by an on-site Customer Service Representative ("CSR") dedicated to a Customer to assist that Customer in requisitioning items needed.

Local computer 20 includes conventional color monitor 22 and alphanumerical keyboard 24 including twelve function keys F1, F2, . . . F12. Local computer 20 is also coupled to printer 26.

Local computer 20 is preferably a conventional microcomputer (such as a 386-, 486- or Pentium-class personal computer) capable of operating the required programs and of transmitting and receiving the required communications, running the OS/2 operating system 32 and also running the CICS OS/2 application 34, both of which are available from IBM.

Electronic sourcing system 5 also includes a requisition/purchasing system 40, preferably but not necessarily the Fisher RIMS system, and a search program 50 that is capable of searching through large volumes of information quickly and accurately. Preferably but not necessarily, the Technical viewer 2 search program ("TV/2"), available from IBM, is used as search program 50. As shown in the embodiment of FIG. 1A, Fisher RIMS 40 and TV/2 search program 50 are run by local computer 20.

Fisher RIMS system 40 is comprised of numerous program modules, including several programs 44, which operate within CICS environment 34 of OS/2 operating system 32. Programs 44 include, among others, Requisition Management ("REQI") program 44A, Inventory Sourcing program or programs 44B, Requisition Maintenance program 44C, Customer Variable program 44D, and Order Header program 44E, each of which will later be described in greater detail. REQI program 44A is most often the RIMS program 44 that interfaces with TV/2 search program 50.

Fisher RIMS system 40 also includes several Fisher RIMS databases 42. These databases 42 preferably include requisition databases 42A, inventory databases 42B, and customer-specific databases 42C, each maintained within OS/2 operating system 32.

Local computer 20 also preferably runs Shell program 52, which operates under search program 50 and is used to customize search program 50 to generate Order Lists 48 (shown in FIG. 1C) with particular fields of formatted data about the items selected using search program 50. Local computer 20 is preferably capable of running both a RIMS program 44 and Shell program 52 at the same time (i.e., in a multi-tasking environment), but the user of local computer 20 usually sees only RIMS program 44 or Shell program 52 at one time in the foreground on monitor 22.

Local computer 20 is also provided with a catalog database 36 comprised preferably of at least two vendor product catalogs. The catalogs, and hence catalog database 36, preferably include such information as part number, price, catalog number, vendor name or I.D., and vendor catalog number, as well as textual information and images of or relating to the catalog products. The nature of the business that the Customer using electronic sourcing system 5 conducts will determine which product catalogs are made a part of catalog database 36.

A feature of the present invention is the ability to search multiple catalogs from different suppliers. For example, catalog database 36 can contain the catalog or catalogs published by a vendor Distributor, having Distributor's catalog numbers for all listed products and vendor manufacturer's part numbers for many of the listed products. Catalog database 36 can further contain catalogs published by some of the vendor manufacturers, listing the manufacturers' part numbers for certain products correspondingly listed in the Distributor's catalogs and for certain products not listed in the Distributor's catalogs. Catalog database 36 can further contain catalogs published by outside suppliers, whether other manufacturers or other distributors, listing such vendor's products different from those in the Distributor's catalogs.

Where the Fisher RIMS system is in use with electronic sourcing system 5, a host computer 10 located at a Distributor site is also provided, as shown in FIG. 1A. Host computer 10 controls all inventory, pricing and requisitioning operations of the Distributor's regularly stocked items using host pricing and inventory databases 11. Host pricing and inventory databases 11 may include such information as: descriptions of the items and the quantities thereof available at a particular Distributor warehouse and at other Distributor warehouses; item records for each Product regularly sold by the Distributor; discount records by Customer; and cross-references from the Distributor's catalog number to its corresponding vendor's part (catalog) number and to similar corresponding catalog numbers of other vendors (suppliers or distributors) for the same Product.

Host computer 10 and local computer 20 are preferably linked point-to-point or in a network employing the formats and protocols of IBM's System Network Architecture ("SNA"). Host computer 10 can be substantially any mainframe or minicomputer capable of running the desired programs and conducting the required communications. Preferably, host computer 10 is a mainframe computer, such as an IBM Model 3090, running the MVS operating system, the MVS-CICS application and a Virtual Telecommunication Access Method communications network.

Figure 1C:
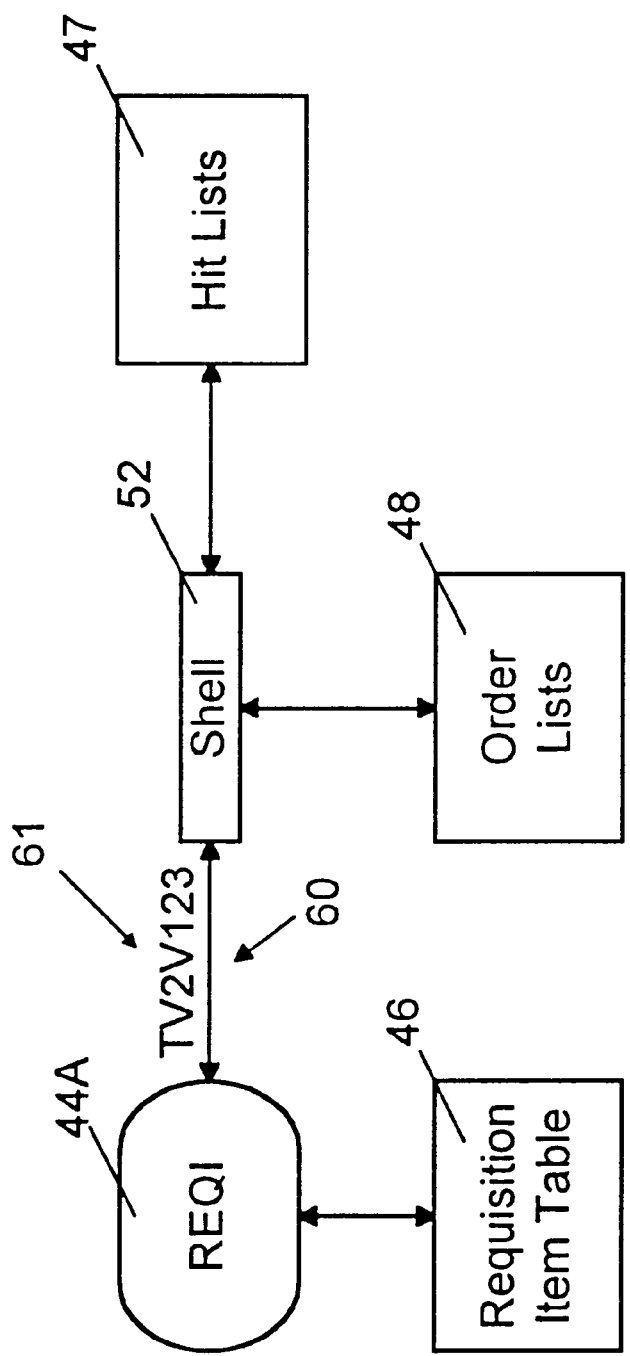
FIG. 1C is a block diagram showing a portion of the embodiment of FIG. 1A in greater detail.
Figure 2:
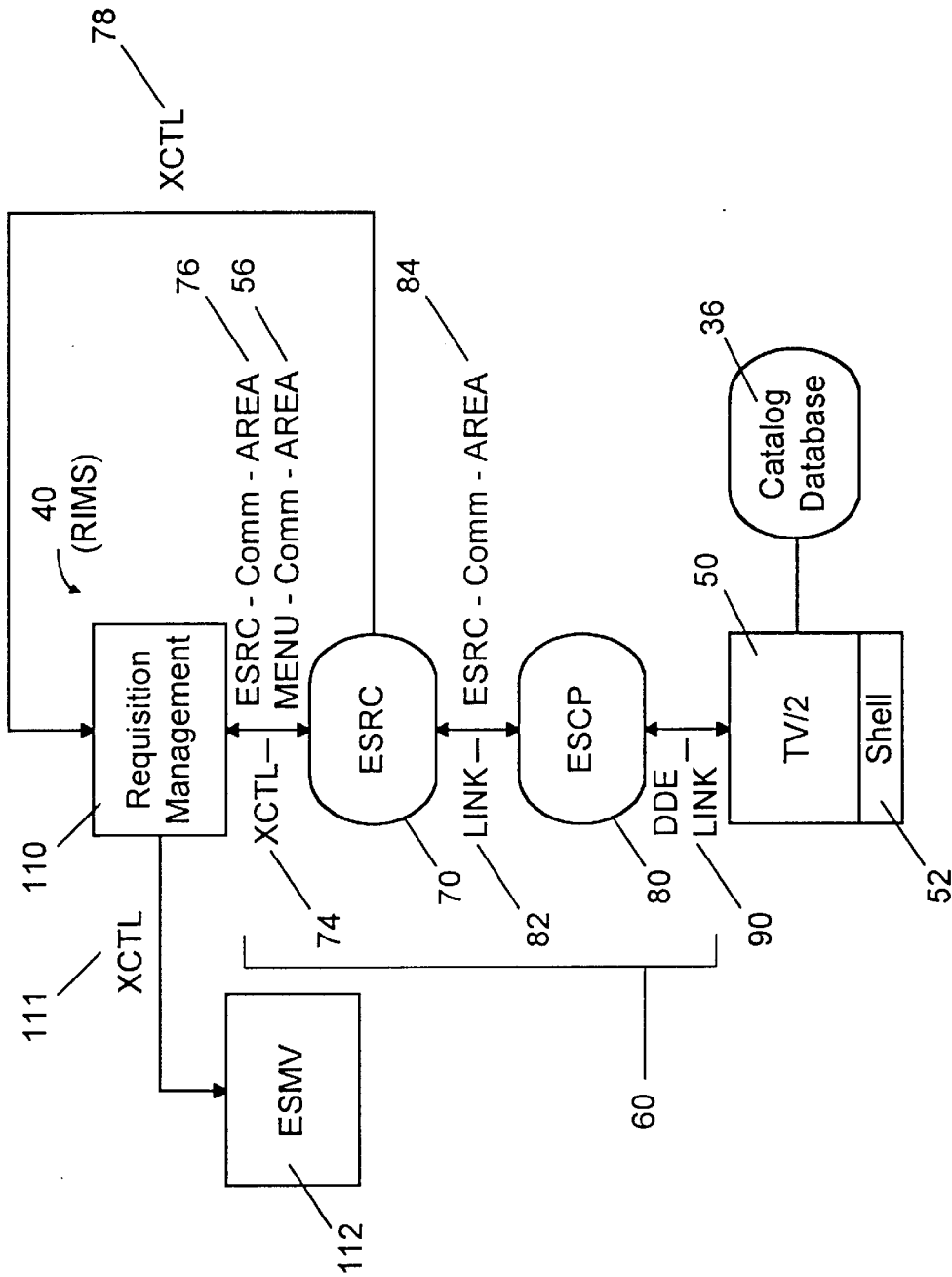
FIG. 2 is a block diagram showing the flow of control and interaction between the various programs and data screens of the programs used for requisition management and vendor catalog searching of the present invention.

As shown in FIGS. 1C and 2, interface 60 is also a part of electronic sourcing interface system 5. Interface 60 communicates shared data between requisition/purchasing system 40 and search program 50. Interface 60 is preferably based upon the dynamic data exchange ("DDE") protocol provided by OS/2 operating system 32. As shown in FIG. 2, interface 60 preferably includes three linking programs to interface requisition/purchasing system 40 and search program 50: ESRC program 70, ESCP program 80 and DDE LINK 90.

A typical data exchange may begin with requisition/purchasing system 40 (which, in the illustrated embodiment, is the Fisher RIMS system) requesting information from catalog database 36 via search program 50. Once a search by search program 50 has been completed, the selected information will be communicated to requisition/purchasing system 40 via interface 60.

Alternatively, if the search of catalog database 36 is initiated from search program 50, the information selected from the search is returned to requisition/procurement system 40 via interface 60.

The start up of electronic sourcing system 5 (FIG. 1A) may be user-initiated or automatically started when the operating system, preferably OS/2 system 32, is brought up on local computer 20. An application-name string 61 must be identified to label interface 60. As shown in FIG. 1C, electronic sourcing system 5 by convention will use "TV2V123," "TV2V124," "TV2V125," etc. as application names 61 supporting the user's requesting service.

Preferably, application names 61 correspond to virtual terminal sessions that exist in the CICS system 34 of requisition/purchasing system 40. There will be a one-to-one correspondence between applications started (such as Shell 52) and CICS virtual terminals in use at a location of requisition/procurement system 40 (such as REQI program 44A). Local computer 20 will query OS/2 operating system 32 to determine the next application-name string 61 to create at start-up. The application-name strings 61 will be created in sequence with V123 being created first, V124 created second, etc. Each application will create only one application name-string 61 to support its user in the CICS environment 34.

If the Fisher RIMS system has been selected as requisition/purchasing system 40, and the TV/2 search program has been selected as search program 50, CICS OS/2 applications 34 must share a workstation with a TV/2 search program 50.

The data passed by interface 60 preferably comprise all or a subset of the following twelve fields: vendor name, vendor number, vendor part (catalog) number, product description, bid price, list price, keyword, page number, quantity, unit, catalog text, and catalog images. Because of the amount of data for catalog images present in database 36 and viewed on monitor 22, these data are usually not passed via interface 60. Any of the above-listed fields may be filled by requisition/purchasing system 40 prior to requesting a search of catalog database 36 by search program 50. However, requisition/purchasing system 40 is not required to pass any data to search program 50. If a field is not passed, that field will be filled with spaces. The fields that are filled with data will assist search program 50 in executing its first search against a specific catalog contained in catalog database 36.

A search priority exists when more than one field is provided by requisition/purchasing system 40. The priority is as follows: (1) part (catalog) number; (2) keyword; and (3) page number. The search will start with priority (1) and proceed through priority (3) in sequence until a search produces products matching the search criteria. At that time, the search will return the matching product information to requisition/purchasing system 40 and stop at the highest priority resulting in a match.

Figure 3:
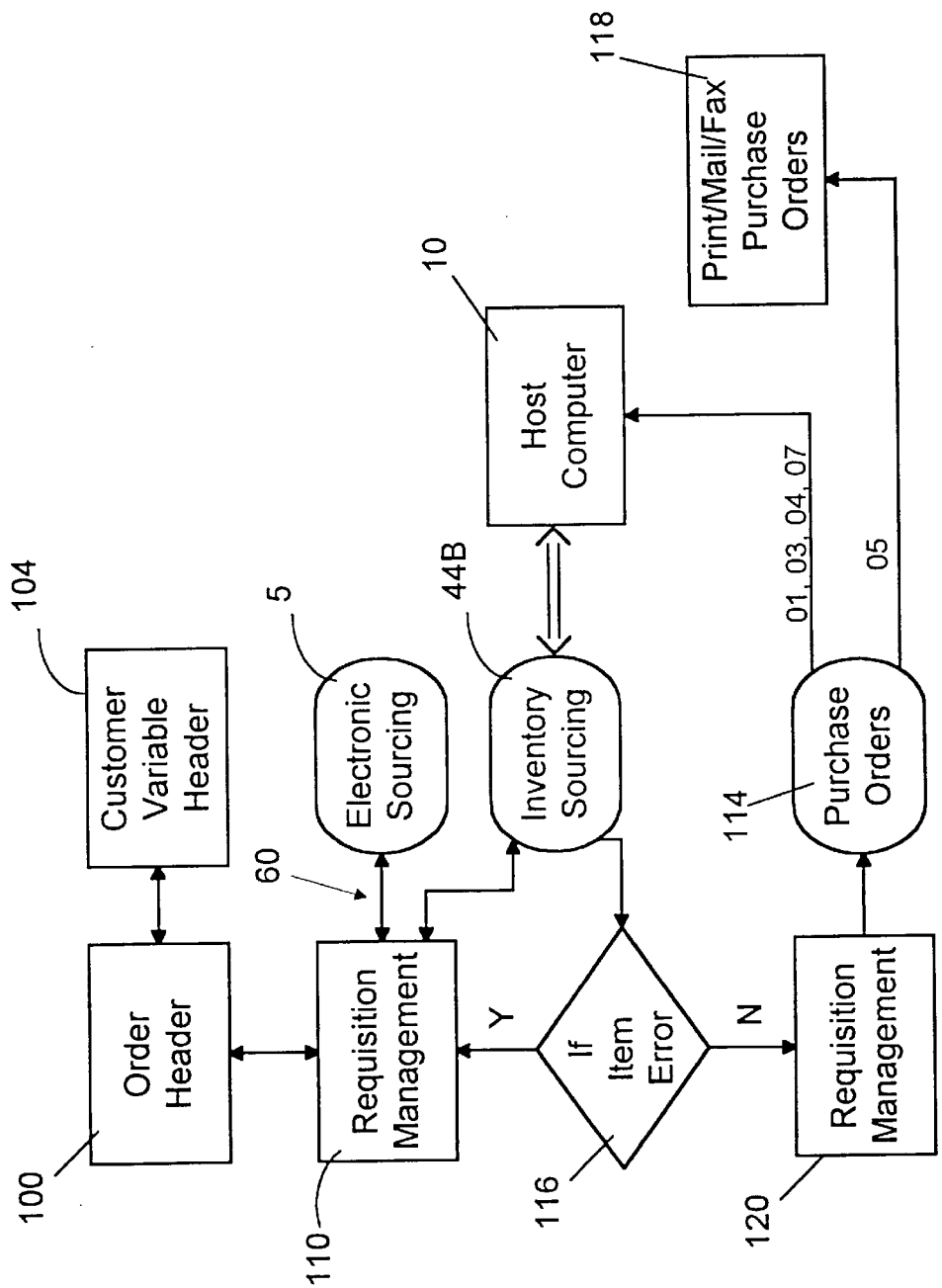
FIG. 3 is a block diagram showing a portion of a system (Fisher RIMS) for requisition management, including the electronic sourcing system of the present invention.

The operation of electronic sourcing system 5 of the present invention will now be more particularly described in the context of FIGS. 1A, 1C, 2 and 3. In FIGS. 2 and 3, the rectangles represent data screens as well as programs associated with those data screens. The rounded rectangles represent programs not associated with data screens such that, while these programs are running, the prior data screen may remain visible without, necessarily, being operational for the input of data. The programs associated with the data screens enable the user of local computer 20 to display and modify the contents of various tables associated with particular data screens. The following description illustrates the use of the Fisher RIMS system as requisition/purchasing system 40, and the TV/2 search program as search program 50. However, it will be understood that the present invention is not limited to such system or program.

Preferably, a user will start the electronic sourcing system 5 from Fisher RIMS system 40. Requisitioning on Fisher RIMS system 40 in context of the electronic sourcing system 5 of the present invention is illustrated in pertinent part in FIG. 3 (and is fully described in application Ser. No. 08/042,168, now U.S. Pat. No. 5,712,989). As data (e.g., Account Number, Requisition Number and Stock Numbers) associated with a single requisition are entered through the various data screens on local computer 20, that computer creates a set of Requisition Tables (including a Requisition Item Table 46, shown in FIG. 1C) for that particular requisition. The Requisition Tables are stored in Requisition databases 42A (shown in FIG. 1A), and can be accessed by local computer 20 using the Requisition Number to find the desired table.

The first step in creating a requisition in Fisher RIMS system 40 involves entry by the user of information in the Order Header program 44D (shown in FIG. 1A), which has an associated Order Header data screen 100 (FIG. 3). A sample of an actual Order Header data screen 100 is set forth in Appendix I. The user enters an Account Number, which generally causes the correct name and address associated with that Account Number to be entered into the appropriate fields of Order Header data screen 100. The user must also enter a Requisition Number in the appropriate field of the Order Header screen 100. Various additional information may also be entered.

At the bottom of Order Header data screen 100 are several fields that describe the function of various function keys. Function keys F6, F9, and F10 all cause the system to jump to a new RIMS program 44 or data screen in Fisher RIMS system 40. For example, pressing the F9 key causes the system to jump to RIMS Customer Variable program 44E (FIG. 1A) and its associated Customer Variable Header data screen 104 (FIG. 3). Customer Variable Header program 44E with its associated Customer Variable Header data screen 104 allows the user to enter and edit information that the particular customer desires to be associated with the requisition due to requirements of the customer's internal accounting system or other systems. Pressing the F10 key will cause the system to enter the Inventory Sourcing program or programs 44B.

Pressing the F6 function key from the Order Header data screen causes Fisher RIMS system 40 to jump to REQI program 44A (FIG. 1A). The screen associated with REQI program 44A is Requisition Management data screen 110 (FIG. 3) illustrated in Appendix II. Within REQI program 44A and its associated Requisition Management data screen 110, Requisition Item Table 46 (shown in FIG. 1C) is a graphical representation of a database table in which certain fields are completed on a list of items that are to be listed, sourced and ordered. Representative Requisition Management data screens 110 showing a Requisition on Requisition Item Table 46 are set forth in Appendices II, VIII and IX. It should be appreciated that data about each item is stored in Requisition Item Table 46, some of which is displayed on the screens shown in Appendices II, VIII and IX. The data stored can additionally include customer variable data. That is, the fields on Requisition Item Table 46 can be expanded to include specific item details used by a particular customer, especially when reports from requisition databases are transferred to the customer's host computer (not shown). The field structure for these data is maintained in customer-specific databases 42C.

The entire process of listing, sourcing and ordering products using Fisher RIMS system 40 can be completed without any reference to a search program 50. As described herein, however, limited fields on specific items can be transmitted from Requisition Item Table 46 to search program 50, and more completed fields of the same or different items can be received from the search program 50 into a Requisition Item Table 46.

At the bottom of Requisition Management data screen 110 (FIG. 3), and Appendices II, VIII and IX) are several fields which describe the function of various function keys (F1, F2, etc.). The user uses REQI program 44A and its associated Requisition Management data screen 110 to enter the catalog or part numbers and quantities of the various items being requisitioned.

The Account Number and Requisition Number are automatically passed to REQI program 44A and its associated Requisition Management data screen 110, and displayed at the top of the Requisition Management data screen 110 in the relevant fields. For example, in the exemplary Requisition Management data screen 110 shown in Appendix II, the number 218848 has been entered in the Account Number field, and the notation "TEST NEW ONE" has been entered in the Requisition Number field.

The user can next enter desired items and quantities for the requisition. Each desired item may be identified by entering its distributor catalog or part number, if known, in the field below the STOCK NBR label on the appropriate line in Requisition Item Table 46 shown on Requisition management data screen 110. In the sample Requisition Management data screen 110 shown in Appendix II, the part number 13246818F has been entered in the STOCK NBR field of Line 001. Once the user has entered such information at least partially describing a desired item on Requisition Management data screen 110, he or she may wish to initiate a search of catalog database 36 to find all the part numbers contained in catalog database 36 that match the part number entered or other information on Requisition Management screen 110. If so, the user enters the letter "S" (for "Select") on the line number of the item that he or she wishes to search in catalog database 36. The letter "S" has been entered to the left of line 001 on the sample Requisition Management data screen 110 shown in Appendix II. Any number of items, or no items, listed on Requisition Management data screen 110 may be marked with "S."

A user may not always have information relating to the catalog or part number for the particular items that are to be requisitioned using Fisher RIMS system 40. Or, the user may have relevant information about an item from a particular vendor but may wish to locate information about the same or a similar product available from other vendors. Or, the user may simply know the name of the item that he or she wishes to requisition. In any of these cases, the user alternatively or additionally could enter text at least partially describing the product to be requisitioned in the "DESC" field of Requisition Management data screen 110 (e.g., Appendix II). Then, the user would initiate the electronic sourcing system 5 of the present invention to search the vendor product catalogs contained in catalog database 36. Alternatively, the user could initiate search program 50 of electronic sourcing system 5 without having first entered information in RIMS system 40 about the product to be requisitioned.

Once the user has built or partially built Requisition Item Table 46 by filling the line numbers (entries) on Requisition Management data screen 110 and selecting those lines to be searched, he or she is now ready to initiate electronic sourcing system 5. Pressing the F11 function key, which is labelled "Catalog," from Requisition Management screen 110 accesses electronic sourcing system 5.

Referring now to FIG. 2, after the user presses the F11 key on Requisition Management data screen 110 of Fisher RIMS system 40, Fisher RIMS system 40 will pass program control via XCTL 74 to ESRC program 70. XCTL 74 is a protocol within CICS application 34 that directs the execution of a program, as would readily be understood by one of ordinary skill in the art. As control is passed from REQI program 44A to ESRC program 70, ESRC-Comm-AREA data structure 76 is passed. ESRC-Comm-AREA is a layout of storage area in local computer 20 created by REQI program 44A to pass data to ESRC program 70, as would readily be understood by one of ordinary skill in the art. ESRC program 70 will then LINK 82 to ESCP program 80 with ESCP-Comm-AREA 84. LINK 82 is a protocol within CICS application 32 that directs the execution of a program, as would readily be understood by one of ordinary skill in the art. Data at least partially describing one item desired to be requisitioned is passed to ESCP program 80 via LINK 82. Thus, if there are five items to be passed to ESCP program 80, there will be five LINKS 82 made. If no items are to be passed to ESCP program 80, only one LINK 82 is made to ESCP program 80. ESCP program 80 can return up to twenty items per LINK 82; in other words, for each item desired to be requisitioned up to twenty desired catalog items contained in catalog database 36 may be sent to REQI program 44A and its associated Requisition Management data screen 110 of Fisher RIMS system 40. If a user chooses to terminate the sourcing process, ESRC program 70 would return to REQI program 44A and its associated Requisition Management data screen 110 without processing any of the records.

ESCP program 80 links with Shell 52 and TV/2 search program 50 via DDE LINK 90. Shell 52 and TV/2 search program 50 search in catalog database 36 for the item or items desired to be requisitioned that has or have been passed from ESRC program 70 to ESCP program 80. Catalog database 36 contains the following fields: vendor name, vendor number, vendor part (catalog) number, product description, list price, page number, quantity, unit, catalog text, and catalog images. Shell 52 and TV/2 search program 50 may, if desired, search the keyword field or any other field shown in Appendix VII. However, not all fields may appear on the monitor 22 of local computer 20, although they are stored in memory.

After the user has pressed the F11 key from Requisition Management data screen 110 and control has been passed from REQI program 44A to Shell 52 and TV/2 search program 50 of local computer 20 will show a footer bar representative of Shell 52 at all times that the user is in the TV/2 search program 50. The footer bar, which also includes appropriate icons, is used to make choices within Shell 52. A sample of the footer bar (without the icons) representing Shell 52 is shown at the base of Appendices III–VII. In the screens of Appendices III–VI, this footer bar is active to select functions. In the screen of Appendix VII, this footer bar is in the background and another footer bar is used to select functions.

If the user has marked an item on Requisition Management data screen 110 with the designation "S," the entered data at least partially describing that item will be sent to Shell 52 and TV/2 search program 50A in the manner described above. TV/2 search program 50 will search catalog database 36 for all items that match the search field sent over from REQI program 44A and Requisition Management data screen 110. When a search is performed in Shell 52 and search program 50, a Hit List 47 is produced, as indicated in FIG. 1C. The user would see on monitor 22 of local computer 20 a Hit List 47 screen representing limited data about all matching catalog items that were located in catalog database 36 as a result of the search. A sample Hit List 47 produced from a search initiated when the entry "OVENS" is received as the description or keyword by search program 50 from Requisition Item Table 46 is shown in Appendix III. Similar Hit Lists 47 are produced when various searches are performed from the Search Input screen shown in Appendix VII. When a Hit List 47 is depicted on monitor 22, the underlying catalog text and pictures (in either partial or complete form) are typically collected in a memory location for rapid viewing, printing or other use.

When multiple catalogs are present in catalog database 36, search program 50 contains a function associated with the catalog symbol of the footer bar and screen window (not shown) for selecting catalogs to be searched. For example, the following choices might be available:

1. Fisher General Catalog 93–94;
2. Fairmont Supplies Catalog;
3. NIST Standards Catalog; and
4. Promega Biological Research Products Catalog.

Fairmont and NIST catalogs list products not in the Fisher General Catalog, but many of the products listed in the Promega catalog are also listed in the Fisher General Catalog (identified by corresponding Fisher catalog numbers). If searching for a molecular biology product, the user would select the Fisher and Promega catalogs. TV/2 search program 50 would then concatenate those two catalogs to perform a keyword, catalog number or other subject search and generate a Hit List of pages (panels) from both catalogs where the searched-for items were found. Similarly, the user might select the Fisher and NIST catalogs when searching for quality control standards or might select the Fisher and Fairmont catalogs when searching for supplies.

If the search is initiated from requisition/purchasing program 40, for example from the Requisition Management data screen 110 of the Fisher RIMS system, then the catalogs searched can be determined by the information provided. If, for example, Promega is indicated as the desired requisition item vendor, interface 60 would direct TV/2 search program 50 to search the Fisher and Fairmont catalogs. If no catalog delimiting information is entered for the item desired to be requisitioned, interface 60 would be set up to search only the Fisher catalog or, alternatively, to search all catalogs in catalog database 36.

Once Hit List 47 has been created by TV/2 search program 50, the user can view it and select particular ones of the located catalog items for Order List 48 that is being created in Shell 52, as shown in FIG. 1C. For example, a search for "Eco RI," a restriction enzyme, may have uncovered five entries in the Promega catalog (identified by Promega catalog numbers R6011, R6012, R6013, R6015 and R401) and five entries in the Fisher catalog (identified by Fisher catalog numbers PRR6011, PRR6012, PRR6013, PRR6015 and PRR4014). If the user selected PRR6012 from the Fisher catalog, Fisher catalog number PRR6012 would be added as an entry to the Items Selected screen, with VN00000001 (identifying the vendor as distributor Fisher) accompanying it in the Order List 48. If the user instead selected the item identified by catalog number R6012 from the Promega catalog, then Promega catalog number R6012 would be added as an entry to the Items Selected screen, with VN00005860 (identifying the vendor as Promega) accompanying it in the Order List. In either case, the information transmitted to REQI program 44A of Fisher RIMS system 40 would also include description, list price and other information taken from the catalog database from which the selection was made. When the resultant requisition is sourced, however (as described below), Distributor's mainframe host computer 10 would recognize the entry for the item from vendor Promega's catalog (R6012, 00005860) as corresponding to that same item available from Fisher's catalog (PRR6012, 00000001). The system thus would transmit back the Customer's contract price and availability for corresponding item PRR6012 as a type 03 (regular Distributor) product available from one of distributor's inventory locations. A purchase order then would be generated for this corresponding Distributor item as further described below.

By contrast, an item selected from the Fairmont catalog would be transferred to Fisher RIMS system 40 with the vendor number for Fairmont, and would be recognized during inventory sourcing as either a type 07 product (that Distributor orders from Fairmont) or as a type 05 item (that Customer orders from Fairmont as an Administrative Purchase). In either of these two cases, a purchase order would be generated for an item, corresponding to a desired catalog item, that is identified by the same Fairmont catalog number that was requisitioned.

After the desired item has been selected from the Hit List 47 by double clicking on that item TV/2 search program 50 can be used to bring up for viewing on monitor 22, or printing on printer 26, images and text from the catalog page on which the item selected is located. For example, as shown in Appendix III, page 1106 of the Fisher catalog has been selected. If the user double clicks on highlighted page 1106, the text shown in Appendix IV (and related images, not shown) would appear on monitor 22. On the sample screen shown in Appendix IV, the item that appears on page 1106 of the Fisher catalog relates to Fisher Isotemp 800 Series Programmable Ovens. Conventional scroll bars appearing on the screen (not shown in Appendix IV) enable the user to scroll through additional catalog information (text and/or images) not yet displayed on the screen. An example of such additional textual information is depicted on the screen shown in Appendix V.

On the screen of Appendix V, the vendor distributor's catalog number ("Cat. No.") 13-246-818F is highlighted. The catalog number of an item normally appears in blue in a screen such as Appendix V. This blue lettering is used for catalog numbers, trademarks, footnotes and other entries for which database 36 contains additional information or cross-references (called hyperlinks). When a search is conducted and the catalog segments of the resultant hit list are reviewed, the test corresponding to the search parameter is highlighted in red. Thus, in Appendix V, catalog number 13-246-818F (identified in the search) appears in red, while catalog number 13-246-838F and the trademark Isotemp each appear in blue. A word, vendor part number or catalog number located by the search will appear red, even if that word or number did not have an associated hyperlink (and thus is not normally blue).

When in search program 50, particular items selected can be added to an Order List 48 pending in Shell 52 and search program 50. When the Ordering portion of catalog text is viewed (as in Appendix V), particular items can be selected so as to be added to the Order List 48 by double clicking on the highlighted catalog number (even if a different field was also highlighted as a result of a search of catalog database 36). The item is then added to an Order List 48 that is created in Shell 52 via a hypertext link. The items that are sent to the Order List 48 are collected and shown on the Items Selected screen of Shell 52. An example of an Items Selected screen of Shell 52 is shown in Appendix VI. The Items Selected screen depicts certain fields of Order List 48 that can be viewed and edited within search program 50. For example, Shell 52 permits the user via a pop-up window (not shown) to select units, e.g. pack or case, and quantity to be ordered, e.g. two packs. Alternatively, the data in these fields can default to one of the smallest unit and the units can be changed when the order is reviewed in REQI program 44A. Additional fields on the same items are also present in memory at this stage. Upon clicking on "Order" when the Items Selected screen (Appendix VI) is viewed, many or all of these fields on the items in the Order List are transmitted back to REQI program 44A (via the programs of interface 60 shown in FIG. 2) to be added to the pending Requisition Item Table 46. The sample Items Selected screen shown in Appendix VI includes the Isotemp Oven with catalog number 1324818F that was located as a result of the search for all items in catalog database 36 that match the part number 13246818F that was entered in the STOCK NBR field of REQI program 44A and its associated Requisition Management data screen 110 of Fisher RIMS system 40.

The following fields are transferred to Order List 48 created in TV/2 search program 50: Vendor name, vendor number, vendor part (catalog) number, product description, list price, page number, quantity, unit and catalog text. However, not all of these fields are viewed on the Items Selected screen.

If more than one item on Requisition Management data screen 110 had been marked with an "S," the process described above is repeated.

If the user desires to do additional searching in catalog database 36 that is not connected to catalog or other items that have been listed on Requisition Management data screen 110 of Fisher RIMS system 40, he or she can click the box on footer bar of Shell 52 that is labelled "Search." Then, a Search screen comes up on monitor 22 of local computer 20. An exemplary Search screen is shown in Appendix VII. In this screen, the usual footer bar is visible in the background, but is not active.

Using the Search screen, a user can search catalog database 36 by page, text description, part number (where the user has the further option to search by Fisher part number, for example if Fisher is to be the desired vendor), Vendor part number, vendor name (for vendors other than Fisher), or bulletin. Stock numbers specific to the customer can also be present in catalog database 36 and searched using the screen of Appendix VII. "Bulletin" refers to an additional vendor publication with detailed product information that may not be included in a vendor catalog. Searching for information contained in bulletins may be done by bulletin number, but only if bulletins have been made a part of catalog database 36. For purposes of this disclosure, bulletins when included in a catalog database are considered a type of catalog.

After the user has entered the field to be searched on the Search Screen, the user clicks on the "SEARCH" box near the bottom of the Search Screen. A Hit List 47 indicating all items from catalog database 36 that match the search field that was entered on the Search Screen then is generated. Then, in a manner similar to that described previously, the user can scroll through the Hit List 47 and double click on the catalog page or panel desired. The user may then also view the detailed information located on the catalog page that was selected from the Hit List 47. During the search, the user may also add additional items to the Order List 48 being built in Shell 52 if desired, whether those additional items had been selected from the Hit List 47 or not.

The Order List that the user has built in Shell 52 is maintained on the Items Selected screen, shown in Appendix VI. From the Items Selected screen, the user can cancel the order by clicking on the "Cancel" box at the bottom of the screen, delete an item from the Order List 48 by moving the pointer bar to the item to be deleted and then clicking on the "Delete" box at the bottom of the screen, or delete all items by clicking on the "Delete All" box. The user can also view catalog text and images for a particular item by clicking on the "Description" box.

Once the user has completely built the Order List 48 within Shell 52 and TV/2 search program 50, he or she can transmit it to Fisher RIMS system 40. This is accomplished by clicking on the "Order" box at the bottom of the Items Selected screen to communicate the completed Order List 48 to Fisher RIMS system 40.

The user may have selected no items, one item or several items from the catalogs contained in catalog database 36 by using TV/2 search program 50. If no items have been selected, the original items that were entered on Requisition Item Table 46 of Requisition Management data screen 110 will remain on that screen and will continue to be processed by Fisher RIMS system 40. If one or several desired catalog items were selected in TV/2 search program 50, the first item selected will replace the original item on Requisition Item Table 46 of Requisition Management data screen 110. Additional items that were selected from the search that was performed in TV/2 search program 50 will be added to Requisition Item Table 46 of Requisition Management data screen 110.

Interface programs ESCP 80 and ESRC 70 (FIG. 2) are used to send data to REQI program 44A (FIG. 1A) and its associated Requisition Management data screen 110 (FIG. 2) about the items that were selected from the search performed by TV/2 search program 50. To the user, it appears that all the items selected from the search are sent over to Fisher RIMS system 40 at the same time. However, ESCP program 80 receives multiple items from TV/2 search program 50, and then sends one item at a time to ESRC program 70. ESRC program 70 then waits until all items have been passed to it before sending data about the items to REQI program 44A and its associated Requisition Management screen 110 of Fisher RIMS system 40. The information transmitted to Requisition Management screen 110 from the Order List built in TV/2 search program 50 and sent through ESCP program 80 and ESRC program 70 includes vendor name, vendor number, vendor part (catalog) number, product description, list price, page number, quantity, unit and catalog text. However, not all of the above-listed fields may be displayed on screen at all times. ESRC program 70 passes control back to Fisher RIMS system 40 via XCTL 78. The requisition number, customer identification and release number (or other data identifying the requisition) will be passed in MENU-Comm-AREA 56 to confirm that the returned data are associated with the proper requisition. MENU-Comm-AREA 56 is a layout of storage area within local computer 20, as one of ordinary skill in the art would readily understand.

As previously indicated, multiple LINKS 82 may have been created between program ESRC 70 and program ESCP 80 if multiple lines were selected (with the "S" symbol) in Requisition Management data screen 110. After completing the first search, and any additional searches initiated with the footer bar, an order list is created and returned to Requisition Item Data Table 46 associated with Requisition Management data screen 110. At this point, the next item is sent from a LINK 82 through program ESCP 80 and DDE LINK 90 to the TV/2 program 50, and a hit list resulting from the corresponding search is displayed on monitor 22. The process of searching, displaying, selecting and ordering is repeated until all of items stored by LINKS 82 have been sent to TV/2 program 50 and searched. At the end of each of these searches, an order list may be created and returned to Requisition Item Data Table 46 or cancelled. Once the last item is completed, ESRC program 70 passes control via XCTL 78, and a Requisition Management screen 110 is displayed, reflecting all of the additions and changes that have been made to the Requisition Item Data Table 46 associated with that requisition.

A limit is normally placed on the number of items of an order that may be returned to the Requisition Item Data Table 46. For example, if the maximum size in Requisition Item Data Table 46 is set at 200 lines, one could create a limit on the size of each order list at 20, 50, 100 or even 200. A corresponding limit can be placed on the number of LINKS 82 that can be established concurrently from the same requisition. Setting a limit of five LINKS 82 and forty items per order list would be one way of avoiding situations in which a Requisition Item Data Table 46 reaches its limit (e.g., 200 lines) before all of the searches (five) have been completed and order lists (five of forty items each) have been returned.

At this point in the use of Fisher RIMS system 40, as many entries (lines) of Requisition Management data screen 110 have been built up (some through use of electronic sourcing system 5) as are necessary to complete the requisition. A sample of such a Requisition Management data screen 110, in which four lines have been entered identifying desired items to be requisitioned (including catalog items located as a result of a catalogs search), is shown in Appendix VIII. The next step is that of inventory sourcing using RIMS inventory sourcing program or programs 44B in Fisher RIMS system 40, as shown in FIG. 3. Inventory sourcing is the process of determining what inventory will be used to fill the requisition. Pricing is also performed in this step when it is called for. Inventory sourcing in Fisher RIMS system 40 is performed on both local computer 20 and host computer 10.

Within Fisher RIMS system 40, a Requisition Item Table 46, as shown in Appendix VIII (similar to that shown in Appendix II, but including more items), can be inventory sourced by pressing the key F6 from REQI program 44A represented by Requisition Management data screen 110 shown in Appendix VIII (and in Appendix II). Since inventory records on JIT items (type 01 and 06) are maintained in inventory database 42B, lines 002 and 004 in Appendix VIII show the availability of these items in inventory (49 items available for line 002, and 0 items available for line 004). After the F6 key has been pressed, host computer 10 searches its host pricing and inventory databases for availability of the various items listed on Requisition Management data screen 110 in different inventory locations (e.g., different warehouses) as described in further detail, below.

After such inventory sourcing, and assuming that no errors occurred during sourcing (as indicated by decision step 116 in FIG. 3), the contract price, source (inventory) location and available quantity or other fields are communicated back to computer 20 by host computer 10, and entered and displayed in the Requisition Management Screen. This can best be seen by comparing lines 001 and 003 of Appendix VIII to Appendix IX, especially as to "QTY AVAIL" (quantity available), "LOC" (inventory location) and price. As Appendix IX indicates, an inventory-sourced Requisition Item Table 46 typically contains the same items, but with more completed fields (including price, product type and inventory location). Moreover, as discussed above, an entry in an inventory-sourced Requisition Management screen may indicate for a requisitioned item a vendor and vendor catalog number that has been changed, from what was obtained from a catalog search, to a corresponding vendor and vendor catalog number for that item from another source (e.g., Fisher—which has its own catalog number for that manufacturer's item that Fisher distributes).

For example, as shown in Appendix IX, product type "01" for the item on line 002 indicates that the requested requisition item is available as Distributor-owned inventory in the JIT inventory that the vendor/distributor maintains near local computer 20, either for the particular Customer or for a group of customers. Product type "06" for the item on line 004 indicates that this item is available for the requisitioner employed by the Customer from inventory owned by Customer's purchasing department but managed by local computer 20. Product type "03" for the items on lines 001 and 003 indicates that these are regular Distributor items that the communication between Distributor's host computer 10 and local computer 20 determined were available in sufficient quantity at one or another of Distributor's general warehouses designated "DEL" and "EDC" in the location ("LOC") field. Product type "05" (not shown in Appendix IX) indicates that a requisitioned item is to be purchased by Customer directly from an outside supplier, using an Administrative Purchase Order that local computer 20 creates and prints (or transmits) for Customer.

The inventory sourcing process described above also determines the net prices shown in Appendix IX for each item. Type 01 and type 03 items are priced by Distributor's host computer 10 searching host databases 11, which contain various formulae and tables of Distributor's pricing agreement with the Customer. Host computer 10 also prices any type 04 or type 07 item, if present. These prices were transmitted to local computer 20 along with the location and availability information for the type 01 items. Prices for type 05 and 06 items are maintained in the local computer's 20 own databases 42B and 42C.

From Requisition Maintenance data screen 120, the CSR can accept all lines of the requisition—if all lines show the status "S" for sourced in the "STAT" field of Requisition Maintenance data screen 120—by pressing the F6 function key. If item errors are found at step 116 in the data transmitted back to local computer 20 from host computer 10 during the sourcing process, then those particular items for which error was found will be returned and displayed by local computer 20 in Requisition Management data screen 110.

Once a requisition has been inventory sourced and accepted by the CSR, it can be converted to one or more purchase orders, as represented by step 114 in FIG. 3. For example, the requisition represented by the Requisition Item Table 46 of Appendix IX, if accepted without further revision by pressing function key F6 ("ACCEPT"), would result in the generation of the following three purchase orders:

A. Line 002 would be ordered from on-site distributor-owned inventory;

B. Line 004 would be ordered from on-site customer-owned inventory (a transfer internal to the customer); and C. Lines 001 and 003 would be ordered, respectively, from Distributor's "DEL and "EDC" warehouses.

Of these three purchase orders, Orders A (type "01") and C (type "03") are shared between host computer 10 and local computer 20 (as shown in FIG. 3). Upon execution of Order A, the inventory records on both computers for Distributor-owned JIT inventory are adjusted synchronously. A purchase order is generated by host computer 10 immediately thereafter. Order B (type "06") is executed and stored only on local computer 20. Upon execution of Order B, the inventory record on local computer 20 is adjusted (the host computer contains no records on Customer-owned JIT inventory or on items ordered by Administrative Purchases). For Administrative Purchases (type 05 items), a purchase order is printed, and mailed or faxed, locally by computer 20 as indicated at step 118 in FIG. 3, or via host computer 10 via EDI (if EDI was selected in the Header of Appendix I and an EDI transfer arrangement existed with vendor).

It is an important feature of the present invention that a requisition may be filled by searching and selecting from a catalog database of items, inventory sourced, and the resulting requisition then divided into one or more purchase orders. This contrasts with known prior art CD-ROM catalog systems in which only a single purchase order to a single supplier is built without reference to inventory records, and in which the information used to create the purchase order is limited to that contained in the product catalog of a single vendor.

Electronic sourcing system 5 also contains the capability to log messages returned from inventory sourcing program or programs 44B of Fisher RIMS system 40. Messages will be logged for any of the following reasons: (1) part number changes for line sent to ESCP program 80; (2) list price from inventory sourcing program 44B differs from list price returned from ESCP program 80; (3) vendor name from inventory sourcing program 44B differs from vendor name returned from ESCP program 80; (4) on a "master or blanket" order, in which local computer 20 tracks the amount of purchases against a blanket or cumulative sum available and/or in which there is limited access to products or limited access to certain users, the part has already been entered on another line; and (5) the maximum number of line items has been reached.

Referring again to FIG. 2, a user is able to view the messages returned by pressing the ALT F11 function keys in REQI program 44A and its associated Requisition Management screen 110 in Fisher RIMS system 40. After the ALT F11 keys have been pressed, REQI program 44A will link to ESMV program 112 via XCTL link 111 for displaying the message log created. ESMV program 112 is a function of Fisher RIMS system 40. ESMV program 112 allows the user to page through the messages created and then to return to Requisition Management screen 110. A sample ESMV message screen associated with ESMV program 112 is shown in Appendix X.

The first two messages of the message screen of Appendix X indicate that a part number for line 001, identified as part number 53610, was successfully added in substitution for a prior part originally entered as part number S100-06 (from the Fisher Scientific catalog). These messages were generated because the originally entered part (S100-06) did not exist in the Fisher catalog, but its corresponding part number S100-06 (that was located by another search in another catalog) did exist in that other catalog. The next message indicates that the vendor for part number 53610 was changed in line 001 from "VN00000001"—meaning that the originally requested vendor (Fisher) was changed. The next two messages indicate that two other part numbers (53620 and 53650) were successfully added as lines 002 and 003.

In the previous description, an exemplary embodiment has been described in which a Distributor CSR operates Fisher RIMS requisition/purchasing system 40 and IBM TV/2 search program 50 as part of a Just-In-Time activity for a particular customer, Customer. Electronic sourcing system 5 of the present invention may also be used, however, in other requisition and purchasing environments.

In some embodiments, a Customer end user or a Customer purchasing employee operating REQI program 44A of Fisher RIMS system 40 may also operate TV/2 search program 50. Operating either from a terminal connected to local computer 20, or from a separate local computer networked with the CSR's local computer 20, such a Customer end user can select requisitioned items for inclusion in Requisition Item Table 46 by keystrokes viewing that screen and by searches in TV/2 search program 50 which are transmitted to the Requisition Item Table 46 via interface 60, as described above. Depending upon his or her authorization level and access code to Fisher RIMS system 40, the Customer purchasing employee may be able to source the final requisition and/or accept the sourced requisition, as shown in Appendix IX. If, however, the sourced requisition was split into more purchase orders than the Customer purchasing employee might prefer, the intervention of the Distributor CSR could be invoked to revise and re-source the requisition (causing, for example, certain items originally sourced as type 01 products to be sourced for this order as corresponding type 03 products from a common Distributor warehouse with other type 03 products on the requisition). The Customer end user may have authority only to build the Requisition Item Table, but then calls the Distributor CSR or Customer purchasing employee to source and accept the requisition.

As shown in FIG. 1B, the present invention also has application to Distributor's regional customer service locations where a large number of CSRs may be placing orders directly on Distributor's host computer 210 for thousands of different customers who call in. In that environment, search program 250, which preferably comprises TV/2 search program 250, and catalog databases 236 are stored on file server 200. In this environment, file server 200 is a large personal computer, a work station or a mini-computer such as an IBM AS/400. Alternatively, the server 200 and a minicomputer (such as an IBM AS/400) can be independently connected to each local computer 200. Each CSR has a local personal computer 220 having a monitor 222, a keyboard 224 and a printer 226. Local computer 220 is provided with programs including requisition/purchasing program 240, Shell program 252 and a graphic user interface 254 (preferably EASEL Workbench program 254 for OS/2) for listing items. One or more of these may be copied from server 220 when needed. Work-in-progress requisitions 260 are established for each customer and are attached to graphic user interface 254. Server 200 maintains complete requisitions 242, in a manner similar to the manner in which local computer 20 maintains requisition databases 42 in the embodiment shown in FIG. 1A.

Normally, in such an environment, the CSR creates Order lists for customers by entering Distributor catalog numbers into graphic user interface 254 and connecting to the Distributor mainframe 210 for price and availability. For this purpose, each local computer is connected to host computer 210 via a phone/dataline and either a gateway or a minicomputer acting as a local host. When a customer asks for products by manufacturer part number or a competitor's catalog number, the CSR has access to cross-reference files, as earlier described, either maintained on the local host or maintained on the Distributor host computer 210.

Appropriate Distributor catalogs and manufacturer catalogs then are consulted, using TV-2 search program 250 and proper selection of Distributor catalogs and of catalogs and bulletins from manufacturers whose products Distributor regularly sells. Catalogs and bulletins are contained in catalog database 236. The resultant lists of products are then transferred by Shell program 252 to a work-in-progress requisition 260, and then entered from graphical user interface 254 directly onto Distributor's mainframe computer 210 as orders from the applicable customer to Distributor. The CSR, knowing which items are available from which Distributor warehouse and direct-shipping supplier, then may divide the customer's requested items into multiple orders, so as to assure that each order is completely filled by a single shipment. In this regional environment, file server 200 or the minicomputer acting as local host can maintain files of completed requisitions 242 which can be subsequently used for generating reports for customers in the region. Reports can be generated either from such local data or from data periodically downloaded to the local host from Distributor's host computer 210.

Another environment where the present invention can be used is in Distributor's purchasing department. The item lists created in that environment can include lists of items Distributor does not regularly stock or purchase, but for which particular customers indicate a requirement to buy. The file server 200 in that environment contains TV-2 search program 250, EASEL graphical user interface 254 and multiple catalog databases 236 containing catalogs similar to the Fairmont and NIST catalogs described above for the embodiment of FIG. 1A. The Distributor purchasing employee can receive by phone or via Distributor's host computer 210 requests for items not shown on Distributor's host databases either as regular products (type 03) or third party items purchased for particular customers on a regular basis (type 07 items). Transmitting certain such requirements to the applicable Distributor purchasing employee can be a function of the inventory sourcing routines of host computer, or may be directed by the Distributor CSR interfacing with the customer.

The Distributor purchasing employee can search appropriate catalogs using TV-2 search program 250, and can transfer the "Items Selected" to a product list in EASEL interface 254. The resultant list might display, for example, supplier part number, supplier, list price, product and catalog page, with access to other fields such as complete description (up to 500 characters). The Distributor purchasing employee can then either forward the information to the CSR, customer end user or customer purchasing employee who requested the item (to confirm that the requirement is being met) or contact the supplier to confirm pricing and availability. Once responses from either or both have been obtained, the Distributor purchasing employee can use the item list in EASEL interface 254 to create one or more of the following purchase orders:

1. an order from the customer to the supplier (an Administrative Purchase);
2. an order from the customer to Distributor (for a type 07 product); and
3. an order from the Distributor to the supplier (usually providing for direct shipment from the supplier to the customer or to a JIT site maintained by Distributor for the customer).

From the foregoing description, it should be apparent that the network arrangements of FIG. 1B can be used to apply the present invention in a variety of contexts. The context will dictate which catalog databases 236 are provided on file server 200: in the regional CSR environment, Distributor's catalogs can be present with a variety of catalogs and bulletins from manufacturers that Distributor regularly represents and a limited selection of outside suppliers; and in the Distributor purchasing environment, the number of outside supplier catalogs will be increased. The number of client (local) computers 220 and the number and size of catalog databases 236 will help dictate what size file server 200 is required. The operating environment (regional CSR site, on-site CSR, on-site CSR networked with Customer end users and with purchaser personnel or Distributor purchasing site) will also affect the catalog databases 236 included, file server 200 size and requisition/purchasing program 240 used. In some situations (e.g., purchasing) each client computer has an independent copy of requisition/purchasing program 240; in others (e.g., on-site CSR) a single copy of the requisition/purchasing program 240 is maintained with associated local databases on the server 200. Where the requisition/purchasing program 240 and local databases are maintained on file server 200, the local database is updated after each use for the benefit of subsequent users. For example, in an environment using Fisher RIMS for requisition/purchasing program 240, if a NIST standard is selected using TV-2 search program 250 and ordered using Fisher RIMS 240 (as either a type 07 purchase from Distributer or a type 05 administrative purchase from NIST), that item is available in the applicable database for subsequent requisitions. For example, a NIST standard ordered as a type 05 item will be stored in the local database on file server 200, with NIST as the vendor for subsequent administrative purchases by Customer. A NIST standard ordered from Distributor as a type 07 item will be stored in Distributor's host databases as a type 07 available to Distributor from NIST. The local databases on file server 200 will also contain records of all items requisitioned and ordered, useful to transfer files to a Customer's computer (e.g., of purchase orders placed by that Customer in a day) or to generate reports for a Customer (e.g., or requisitions placed by each Customer department and/or budget number in a week).

Thus it is seen that an electronic sourcing system including means for linking a requisition/purchasing system and a means for searching large volumes of information has been described. Persons skilled in the art will appreciate that the present invention can be practiced by other than the described embodiments, which are presented for the purposes of illustration and not of limitation, and the present invention is limited only by the claims which follow.

---

APPENDIX I

FISHER SCIENTIFIC RIMS
REQUISITION HEADER

```
        DATE: 08/05/94
        TIME: 07:04:57
   ACCT-NBR:             NAME:
                      ADDRESS:
    COMPANY: :
             :
     REQ NBR: :
     RELEASE:           ORDER TYPE: R ORDER
                          HOLD/REL: I            RUSH CODE: 9
      CALLER:        FREIGHT OVERRIDE: N         TAX OVERRIDE:
                     EDI PO TO HOST: N POA 855
        ATTN:              PRT ACK: Y            NBR OF COPIES: 1
                     ACK DELV CODE: P PRINT & DELIVER
     BILL TO:         REQ DELV CODE: W WALK IN
                     SERVICE CHARGE: 0.00
      VENDOR:
                             CREATED: 08-04-1994         STATUS: R
   RESPONSE:    KEY(S):
   +F2: ADD  F3: EXIT  F4: UPDATE  F5: REFRESH  F6: ITEM  F9: VAR  F10: SRCE  F11: CHGPO  F12: DEL
   13V123
```

APPENDIX II

* REQUISITION MANAGEMENT SCREEN *

```
   ACCT NBR: 218848 002  REQ NBR: TEST NEW ONE
         COMP:   1         REL NBR:
         S LINE  STOCK NBR      QTY     UM   PT    STKRM XREF SPI    UNIT PRICE      EXT PRICE
           001   13246818F       0      CS   03                      0.00            0.00
           DESC:                                 QTY AVAIL:    0   LOC:    FSHR  WHSE: BLW
           002
           DESC:                                 QTY AVAIL:        LOC:          WHSE:
           003
           DESC:                                 QTY AVAIL:        LOC:          WHSE:
           004
           DESC:                                 QTY AVAIL:        LOC:          WHSE:
           005
           DESC:                                 QTY AVAIL:        LOC:          WHSE:
   RESPONSE:    KEY(S):
   ALL ITEMS DISPLAYED
       F3: EXIT  F6: SOURCE  F7: BKWD  F8: FWD  F9: NEW  F10: NONCAT  F11: CATALOG  F12: CNCL
```

APPENDIX III

```
            ovens
         General
         (1106)Fisher Isotemp 800 Series Programmable Ovens
         (1107)Isotemp 700 Series Deluxe Lab Ovens
         (1108)Isotemp 600 Standard Lab Ovens
         (1109)Fisher Isotemp 500 Series Economy Lab Ovens
         (1110)Gravity Convection Ovens
         (1111)Utility ovens
         (1112)Mechanical Convection Ovens with Electronic Temperature
         (1113)General-Purpose Ovens
         (1114)Heavy Duty Deluxe Ovens
```

-continued (1116) Large Capacity Model 2882A
(1117) Standard Capacity Model 281A
(1118) Fisher Models 280 and 285 Vacuum Ovens
(1119) NAPCO Vacuum ovens Help  Catalogs  Search  Order List  Minimize  Clear  Prev  Next  Exit

APPENDIX IV (FSC1106) Fisher Isotemp 800 Series Programmable Ovens

Fisher Isotempx 800 Series Programmable Ovens
  Three linear heat-up and cool-down stages
  Talking control panel
  Keypad and lighted graphics
  30° to 325° C. range
  Rs-422 serial communications capability
  The latest technology at your fingertips. Accurate, easy-to-use controls allow you to program up to 3 heat-up stages and 3 cool-down stages linearly to provide the most appropriate conditions for your samples. Using the large keyboard, you can choose the heat-up or cool-down rate, the temperature you want for each stage, and the length of time you want the oven to hold each temperature. And, for projects requiring repeatability, you can duplicate the settings at any time.

Help  Catalogs  Search  Order List  Minimize  Clear  Prev  Next  Exit

APPENDIX V (FSC1106) Fisher Isotemp 809 Series Programmable Ovens

| Model | 818F | 838F |
|---|---|---|
| Inside D × W × H | 16 × 12 × 16 (41 × 30 × 41 cm) | 18 × 18 × 20 (46 × 46 × 51 cm) |
| Shp. Wt. | 156 lb. (71 kg) | 195 lb. (88 kg) |
| Electrical Requirements | 230 V 50/60 Hz 11.3 Amps | 230 V 50/60 Hz 19 Amps |
| Cat. No. | 13-246-818F | 13-246-838F |
| Each | 3495.00 | 3995.00 |

Extra Shelves for 800 Series Ovens
No-tip design. Move to any position in seconds. Full Depth Shelves: Chrome-Plated Steel Help  Catalogs  Search  Order List  Minimize  Clear  Prev  Next  Exit

APPENDIX VI

ITEMS SELECTED

| Part Number | Description | List Price |
|---|---|---|
| 13246818F | ISOTEMP OVEN MDL818F 230 V | 3495.00 |

Help  Cancel  Delete  Delete All  Order  Description

APPENDIX VII

SEARCH
  Page:
  Search For:
  Part Number:    ○ Fisher    ○ Vendor    ○ Customer
  Vendor Name:
  Bulletin:
  HELP  SEARCH  CANCEL  CLEAR  USER DATA  EXTENDED
  Help  Catalogs  Search  Order List  Minimize  Clear  Prev  Next  Exit

APPENDIX VIII

RICREQI1              FISHER SCIENTIFIC RIM5              DATE: 07-29-94
                      REQUISITION MANAGEMENT SCREEN        TIME: 14:54:22

ACCT NBR: 363690 006    REQ NBR: PO NBR 001
   COMP: 1              REL NBR:
 0 LINE  STOCK NBR      QTY    UM   PT    STKRM XREF SPI    UNIT PRICE      EXT PRICE
    001  A191            1     EA   03                       0.00           0.00
    DESC:                           QTY AVAIL:    0    LOC:  FSHR WHSE: EDC
    002  02540K          1     PK   01                       0.00           0.00
    DESC:                           QTY AVAIL:   49    LOC:  WHSE: JIT
    003  13246818F       1     EA   03                       0.00           0.00
    DESC:                           QTY AVAIL:    0    LOC:  FSHR          WHSE: EDC
    004  A181-06         1     EA   06                       100.00         100.00
    DESC: ACETONE                   QTY AVAIL:    0    LOC:  WHSE: JIT
JIT BACKORDER WILL OCCUR
    005
    DESC:                           QTY AVAIL:    0    LOC:  WHSE:
RESPONSE:      KEYS(S):
I ITEM(S) PROCESSED

-continued

```
       +F3: EXIT   F6: SOURCE   F7: BKWD:   F8: FWD   F9: NEW ITM   F10: NONCAT
                              F11: CATALOG   F12: CNCL
1B V123
```

APPENDIX IX

```
RICPOMP1                FISHER SCIENTIFIC RIMS              DATE:  08-03-94
                      REQUISITION MANAGEMENT SCREEN         TIME:  07:44:13

COMP ID: 001          REQ-NBR: PO NBR 001
    ACCT NBR: 363690 006   REL-NBR:
   ORDER NBR:                        PICKLIST REVIEWED:
SERVICE:          0.00 ORDER:    0.00     FREIGHT:
CARRIER:
O LINE    PART         QTY    UOM PRD    UNIT PRICE    SERVICE     EXT PRICE  LOC  STAT
001       A181          1     EA  03     35.30         0.00        35.30      DEL  S
          ACETONE CERTIFIED ACS    1L   QTY AVAIL:  1    QTY REC:   0
002       02540K        1     PK  01     32.70         0.00        32.70      JIT  S
          BEAKER GRIFFIN 250 ML    12/9 QTY AVAIL:  49   QTY REC:   0
003       13246818F     1     EA  03     3495.00       0.00        3495.00    EDC  S
          PROGRAMMABLE OVEN             QTY AVAIL:  0    QTY REC:   0
004       A181-06       1     EA  06     100.00        0.00        100.00     JIT  S
          ACETONE                       QTY AVAIL:  0    QTY REC:   0
RESPONSE:       KEY(S):
  +F3: EXIT   F6: ACCEPT   F7: BKWD   F8: FWD   F9: PRINT ACK   F11: M/B ERRORS   F12 DELETE
1B V123
```

APPENDIX X

```
                    *** REQUISITION MANAGEMENT SCREEN ***

ACCT NBR: 218848 002     REQ NBR: TEST NEW ONE
    COMP: 001            REL NBR:
                         ELECTRONIC SOURCING MESSAGES
           LINE NUMBER                  001              PART NUMBER 53610
PART ADDED SUCCESSFULLY
           LINE NUMBER                  001              PART NUMBER 53610
REPLACEMENT WAS MADE FOR PRIOR PART: S100-06
           LINE NUMBER                  001              PART NUMBER 53610
VENDOR CHANGED FROM: VN00000001
           LINE NUMBER                  002              PART NUMBER 53620
PART ADDED SUCCESSFULLY
           LINE NUMBER                  003              PART NUMBER 53650
PART ADDED SUCCESSFULLY
                   F6: RETURN    F7: BACKWARD    F8: FORWARD
```

We claim:

1. An electronic sourcing system comprising:
   a collection of catalogs of items stored in an electronic format;
   a first set of pre-determined criteria associated with said collection of catalogs;
   a second set of pre-determined criteria associated with items from each of said catalogs;
   a catalog selection protocol, said catalog selection protocol relying on said first set of pre-determined criteria to select less than said entire collection of catalogs, and including matching a vendor identification code with a subset of said collection of catalogs, wherein said subset of catalogs includes both a vendor catalog from a predetermined vendor and a second catalog from a predetermined third party that is one of a manufacturer and a competing vendor, said predetermined third party selling items corresponding to items in said vendor catalog; and
   a search program, said search program relying on said second set of criteria to select specific items from said catalogs determined from said catalog selection protocol.

2. An electronic sourcing system as recited in claim 1, wherein catalogs comprising said collection of catalogs are stored in separate databases.

3. An electronic sourcing system as recited in claim 1, wherein said catalogs comprising said collection of catalogs are stored in a single database.

4. An electronic sourcing system as recited in claim 1, wherein said predetermined third party makes items in said vendor catalog.

5. An electronic sourcing system as recited in claim 1, further including a cross reference table linking a vendor item catalog number from said vendor catalog with an item catalog number from said predetermined third party.

6. An electronic sourcing system as recited in claim 1, wherein said second set of predetermined criteria includes at least one of a catalog number and item textual information.

7. An electronic sourcing system as recited in claim 1, wherein said catalog selection protocol includes providing an electronic listing of available catalogs from said collection of catalogs.

8. An electronic sourcing system as recited in claim 7, wherein said electronic listing of available catalogs is less than said collection of catalogs.

9. An electronic sourcing system comprising:
   a collection of catalogs of items stored in an electronic format;
   a first identification code associated with a first item in a first catalog;
   a second identification code associated with a second item in a second catalog, said first item and said second item being generally equivalent, and wherein a selection of one identification code from one of said first and second catalogs provides the other identification code from the other of said catalogs.

10. An electronic sourcing system as recited in claim 9, wherein said first identification code is identical to said second identification code.

11. An electronic sourcing system as recited in claim 9, wherein at least of one of said first and second catalogs includes said first and second identification codes.

12. An electronic sourcing system as recited in claim 9, wherein said selection includes a comparison of said one of said first and second identification codes with a cross-reference table listing both of said identification codes as being generally equivalent.

13. An electronic sourcing system as recited in claim 9, wherein a user selects one of said first and second identification codes, lacks access to said catalog corresponding to said selected identification code, but is given access to the other said catalog corresponding to said non-selected identification code.

14. An electronic sourcing system as recited in claim 9, wherein a user selects one of said first and second identification codes, and has access to both said first and second catalogs.

15. An electronic sourcing system as recited in claim 9, wherein said first and second identification codes correspond to a part number.

16. An electronic sourcing system comprising:
   at least two product catalogs containing data relating to items such that an item in a first catalog is generally equivalent with an item in a second catalog; and
   converting means for converting data relating to said item from said first catalog to data relating to said item from said second catalog.

17. An electronic sourcing system as recited in claim 16, wherein at least one catalog database contains said data from each of said catalogs, and said converting means includes a non-catalog database containing a cross-reference table such that use of a reference code corresponding to an entry in said cross-reference table links said item from said first catalog to data relating to said item from said second catalog.

18. An electronic sourcing system as recited in claim 16, wherein one or more catalog databases contain said data from each of said catalogs, and said converting means including one or more catalog databases including an identical reference code corresponding to said data from said first catalog and said data from said second catalog.

19. An electronic sourcing system as recited in claim 16, wherein said first catalog may be searched separately from said second catalog.

20. An electronic sourcing system as recited in claim 19, wherein a user lacks access to said first catalog and has access to said second catalog, such that a request for an item in said first catalog provides said data from said second catalog.

21. An electronic sourcing system comprising:
   a requisition module including data fields, user-generated criteria entered into at least one of said data fields to generate at least partial criteria corresponding to a desired item;
   a catalog collection searching module, said searching module including a collection of catalogs of items stored in an electronic format, a catalog selection criteria used to select less than said entire collection, said searching module being used to generate additional search-module criteria for said data fields of said requisition module;
   a multiple purchase order generation module, said purchase order generation module creating multiple purchase orders from a single requisition created with said user-generated criteria and said search-module criteria;
   wherein each of at least two catalogs include a generally equivalent item from a different source, said requisition module working in combination with said catalog searching module to determine multiple sources for said item;
   wherein said multiple sources is limited by said catalog searching module providing a match according to said user-generated criteria, said search-module criteria and a determination system that located items are generally equivalent; and
   wherein said determination system includes a cross reference table matching an identification code from a first located item with a second identification code from a second located item.

22. An electronic sourcing system as recited in claim 21, wherein said determination system includes an identical identification code for each of said located items.

23. An electronic sourcing system, as recited in claim 21, wherein said requisition module generates a preferred requisition based on at least one of product availability and user preferences in accordance with a determination of multiple sources for a desired item.

24. An electronic sourcing system as recited in claim 21, wherein less than said catalog selection criteria is determined by at least one of said user-generated criteria or user characteristics.

25. An electronic sourcing system as recited in claim 24, wherein said user characteristics include a listing of catalogs from which a user is allowed to purchase.

26. An electronic sourcing module as recited in claim 21, wherein said requisition module uses at least one pre-determined rule to select which of multiple sources to use for said desired item.

27. An electronic sourcing system as recited in claim 26, wherein said pre-determined rule relies on item availability.

28. An electronic sourcing system as recited in claim 26, wherein said pre-determined rule relies on a hierarchy of preferred sources.

29. An electronic sourcing system comprising:
   a collection of catalogs of items stored in an electronic format;
   a first set of pre-determined criteria associated with said collection of catalogs;
   a second set of pre-determined criteria associated with items from each of said catalogs;
   a catalog selection protocol, said catalog selection protocol relying on said first set of pre-determined criteria to select less than said entire collection of catalogs, and including matching a vendor identification code with a subset of said collection of catalogs, wherein said subset of catalogs includes both a vendor catalog from a predetermined vendor and a second catalog from a predetermined third party;
   a search program, said search program relying on said second set of criteria to select specific items from said catalogs determined from said catalog selection protocol; and
   a cross-reference table linking a vendor item catalog number from said vendor catalog with an item catalog number from said predetermined third party.

* * * * *

UNITED STATES PATENT AND TRADEMARK OFFICE
CERTIFICATE OF CORRECTION

PATENT NO : 6,055,516
DATED : April 25, 2000
INVENTOR(S) : James M. Johnson et al.

It is certified that error appears in the above-identified patent and that said Letters Patent are hereby corrected as shown below:

On title page, item 73 Assignee
  replace "Procurenet, Inc."
  with --Fisher Scientific Company L.L.C.--.

On title page, item 63 Related U.S. Application Data
  please insert --, issued as US Patent No. 6,023,683 on February 8, 2000--.

Col. 1, line 2
  please insert --, issued as US Patent No. 6,023,683 on February 8, 2000--.

Signed and Sealed this

First Day of May, 2001

Attest:

NICHOLAS P. GODICI

Attesting Officer          Acting Director of the United States Patent and Trademark Office

US006055516C1

(12) EX PARTE REEXAMINATION CERTIFICATE (10258th)
United States Patent
Johnson et al.

(10) Number: US 6,055,516 C1
(45) Certificate Issued: Aug. 14, 2014

(54) ELECTRONIC SOURCING SYSTEM

(75) Inventors: James M. Johnson, Bridgeville, PA (US); Robert P. Kinross, Ben Avon, PA (US); Francis J. Melly, Pittsburgh, PA (US); Douglas A. Momyer, Upper St. Clair, PA (US)

(73) Assignee: Eplus Inc., Herndon, VA (US)

Reexamination Request:
No. 90/009,636, Nov. 12, 2009

Reexamination Certificate for:
Patent No.: 6,055,516
Issued: Apr. 25, 2000
Appl. No.: 09/234,366
Filed: Jan. 20, 1999

Certificate of Correction issued May 1, 2001

Related U.S. Application Data

(63) Continuation of application No. 08/288,577, filed on Aug. 10, 1994, now Pat. No. 6,023,683.

(51) Int. Cl.
*G06Q 30/00* (2012.01)

(52) U.S. Cl.
USPC ............... 705/26.8; 701/1; 701/10; 701/104; 705/26.62; 705/27.1

(58) Field of Classification Search
None
See application file for complete search history.

(56) References Cited

To view the complete listing of prior art documents cited during the proceeding for Reexamination Control Number 90/009,636, please refer to the USPTO's public Patent Application Information Retrieval (PAIR) system under the Display References tab.

*Primary Examiner* — Joseph R Pokrzywa

(57) ABSTRACT

An electronic sourcing system includes a computer that maintains a catalog database of data including product information (such as product identification and descriptive information) relating to catalog items available from vendor product catalogs, and a means for building (generating) a requisition including at least one requisitioned item. Information at least partially identifying an item desired to be requisitioned is entered by a user, and utilized by a means for searching the database for catalog items matching that information and for selecting at least one catalog item located as a result of the search. Text describing the catalog items, and images of the items, may be viewed. Data identifying selected catalog items are communicated to the requisition building means, which generates a requisition including entries for items corresponding to the selected catalog items. The system checks the availability in one or more inventory locations of the corresponding desired catalog items, and generates one or more purchase orders for desired items from inventory locations stocking the items.

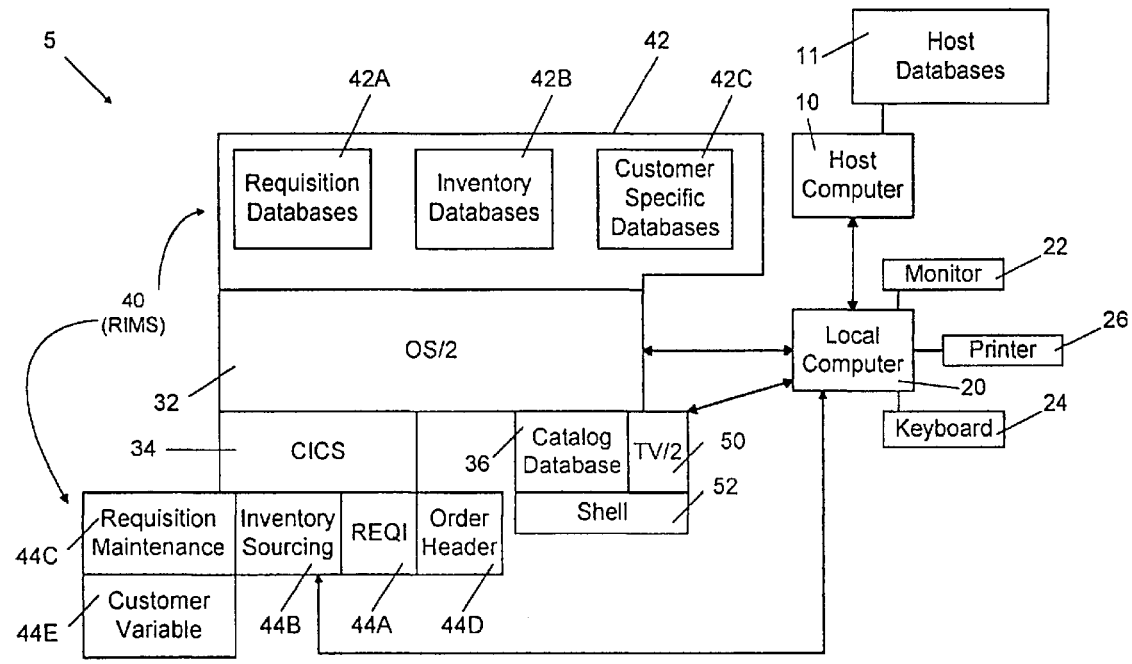

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 21-28 is confirmed.

Claims 1-20 and 29 are cancelled.

\* \* \* \* \*